(12) United States Patent
Sesti et al.

(10) Patent No.: US 10,019,742 B2
(45) Date of Patent: Jul. 10, 2018

(54) CONFIGURABLE ONLINE 3D CATALOG

(71) Applicant: ONU, LLC, Southfield, MI (US)

(72) Inventors: Settimio Michael Sesti, Clarkston, MI (US); Sean Hurwitz, Novi, MI (US)

(73) Assignee: ONU, LLC, Southfield, MI (US)

(*) Notice: Subject to any disclaimer, the term of this patent is extended or adjusted under 35 U.S.C. 154(b) by 0 days.

(21) Appl. No.: 15/298,364

(22) Filed: Oct. 20, 2016

(65) Prior Publication Data
US 2017/0039610 A1  Feb. 9, 2017

Related U.S. Application Data

(63) Continuation of application No. 14/484,920, filed on Sep. 12, 2014.

(51) Int. Cl.
| | |
|---|---|
| *G06Q 30/00* | (2012.01) |
| *G06Q 30/06* | (2012.01) |
| *G06T 19/00* | (2011.01) |
| *G06F 3/0481* | (2013.01) |
| *G06F 3/0482* | (2013.01) |

(Continued)

(52) U.S. Cl.
CPC ....... *G06Q 30/0603* (2013.01); *G06F 3/0482* (2013.01); *G06F 3/04815* (2013.01); *G06Q 30/0641* (2013.01); *G06Q 30/0643* (2013.01); *G06T 19/003* (2013.01); *G06T 19/20* (2013.01); *G06F 3/04817* (2013.01); *G06F 3/04842* (2013.01); *G06T 13/20* (2013.01)

(58) Field of Classification Search
CPC ........... G06Q 30/06; G06Q 30/0601–30/0645; G06T 19/003; G06T 19/20; G06T 13/20; G06F 3/04815; G06F 3/0482; G06F 3/04817; G06F 3/04842

USPC ........... 705/26.1–27.2, 26.61; 345/419, 581, 345/649, 650, 653
See application file for complete search history.

(56) References Cited

U.S. PATENT DOCUMENTS

| | | |
|---|---|---|
| 7,013,290 B2 | 3/2006 | Ananian |
| 7,299,290 B2 | 11/2007 | Karpoff |

(Continued)

OTHER PUBLICATIONS

Parts Catalog, 2013, Siemens. Accessed via http://www.ugitc.com/Uploads/Editor/file/20180111/1515653605282101.pdf (Year: 2013).*

(Continued)

*Primary Examiner* — Resha Desai
*Assistant Examiner* — Allison G Wood
(74) *Attorney, Agent, or Firm* — Brooks Kushman P.C.

(57) ABSTRACT

A system may include a server device configured to receive, from a catalog administrator device, a 3D product model encoded in a 3D modeling format, receive, from the catalog administrator device, a definition of a hotspot including an association of a location on the 3D product model with an element of product media related to an aspect of the 3D product model, and store the 3D product model in a data store in association with the hotspot and the element of product media. A user device may be configured to receive a 3D catalog from a server device, display, on the user device using a 3D object renderer, a 3D product model of the 3D catalog, the 3D product model being encoded in a 3D modeling format, and send, to the server device, analytics data indicative of user interaction with the 3D product model using the 3D object renderer.

20 Claims, 8 Drawing Sheets

(51) Int. Cl.
*G06T 19/20* (2011.01)
*G06F 3/0484* (2013.01)
*G06T 13/20* (2011.01)

(56) References Cited

U.S. PATENT DOCUMENTS

| | | | | |
|---|---|---|---|---|
| 7,712,052 | B2 | 5/2010 | Szeliski et al. | |
| 8,117,089 | B2 | 2/2012 | Minsky et al. | |
| 8,200,552 | B2* | 6/2012 | Swanson | G06Q 10/0875 705/26.1 |
| 8,264,504 | B2 | 9/2012 | Naimark | |
| 8,797,327 | B2 | 8/2014 | Finn et al. | |
| 2002/0010655 | A1 | 1/2002 | Kjallstrom | |
| 2002/0116298 | A1 | 8/2002 | Kamon et al. | |
| 2002/0178301 | A1* | 11/2002 | Boyd | G06F 9/541 719/328 |
| 2002/0184111 | A1* | 12/2002 | Swanson | G06Q 10/0875 705/26.5 |
| 2004/0249727 | A1 | 12/2004 | Cook, Jr. et al. | |
| 2005/0081161 | A1 | 4/2005 | MacInnes et al. | |
| 2005/0162419 | A1 | 7/2005 | Kim et al. | |
| 2008/0247636 | A1* | 10/2008 | Davis | G06T 19/00 382/152 |
| 2009/0113349 | A1 | 4/2009 | Zohar et al. | |
| 2009/0241061 | A1 | 9/2009 | Asai et al. | |
| 2011/0262103 | A1* | 10/2011 | Ramachandran | H04N 5/44591 386/240 |
| 2012/0179983 | A1 | 7/2012 | Lemire | |
| 2012/0259738 | A1* | 10/2012 | Pillai | G06T 17/00 705/26.61 |
| 2013/0066750 | A1* | 3/2013 | Siddique | G06Q 10/0637 705/27.2 |
| 2014/0253546 | A1* | 9/2014 | Hickman | G09G 5/00 345/419 |
| 2015/0120496 | A1* | 4/2015 | Watson | G06F 3/147 705/26.8 |

OTHER PUBLICATIONS webgl-3d-mode.pdf; available at http://www.radiatedpixel.com/wordpress/2013/03/27/webgl-3d-model-viewer-using-three-js/; Mar. 27, 2013.

example33.pdf; available at http://ww.ajax-zoom.com/examples/example33.php; last accessed Dec. 1, 2015.

360 Product Photography _ 360 Photography—It is what we do_.pdf; available at http://www.photospherix.com/; last accessed Dec. 1, 2015.

"CL3VER brings interactive 3D Presentations to Apple iOS devices," retrieved Jan. 24, 2016, available at https://www.cl3ver.com/blog/cl3ver-brings-interactive-3d-presentations-to-apple-ios-devices/.

"CL3VER secures 800,000 US dollars in seed round of funding," retrieved Jan. 24, 2016, available at https://www.cl3ver.com/blog/cl3ver-secure-800000-dollars-seed-funding/.

"CL3VER announces new features," retrieved Jan. 24, 2016, available at https://www.cl3ver.com/blog/cl3ver-announces-new-features/.

Screenshots from Kia Presentation, retrieved Jan. 24, 2016, available at http://3d.cl3ver.com/lkSOt.

"Anatomy of the foot and ankle," retrieved Jan. 24, 2016, available at https://www.cl3ver.com/blog/cl3ver-for-medical-presentations-anatomy-of-the-foot-and-ankle/.

Screenshots from Foot and Ankle Presentation, retrieved Jan. 24, 2016, available at http://3d.cl3ver.com/1cuXr.

"CL3VER for Electronic OEM and Retail—3D GPU Presentation," retrieved Jan. 24, 2016, available at https://www.cl3ver.com/blog/cl3ver-for-electronic-products-3d-gpu-presentation/.

Screenshots from 3D GPU Presentation, retrieved Jan. 24, 2016, available at http://3d.cl3ver.com/RziYF.

International Search Report and Written Opinion for PCT/US2015/049643 dated Dec. 10, 2015.

* cited by examiner

CONFIGURABLE ONLINE 3D CATALOG

CROSS-REFERENCE TO RELATED APPLICATIONS

This application is a continuation of U.S. application Ser. No. 14/484,920 filed Sep. 12, 2014, the disclosure of which is hereby incorporated in its entirety by reference herein.

TECHNICAL FIELD

Aspects disclosed herein generally relate to the administration and display of catalogs of 3D product models.

BACKGROUND

Product catalogs may be used by vendors or sales forces to provide customers with information regarding products that are available for sale. Product catalogs may include information such as images of the product, feature listings of the product, pricing, options and available configurations. With the advent of the Internet, companies have made use of online catalogs accessible via the World Wide Web. However, such Internet catalogs are difficult for customers to use, and also difficult for system administrators to manage. Moreover, such Internet catalogs may be costly to implement and modify.

SUMMARY

In a first illustrative embodiment, a system includes a server device configured to receive, from a catalog administrator device, a 3D product model encoded in a 3D modeling format, receive, from the catalog administrator device, a definition of a hotspot including an association of a location on the 3D product model with an element of product media related to an aspect of the 3D product model, and store the 3D product model in a data store in association with the hotspot and the element of product media.

In a second illustrative embodiment, a system includes a user device configured to receive a 3D catalog from a server device, display, on the user device using a 3D object renderer, a 3D product model of the 3D catalog, the 3D product model being encoded in a 3D modeling format, and send, to the server device, analytics data indicative of user interaction with the 3D product model using the 3D object renderer.

In a third illustrative embodiment, a non-transitory computer-readable medium tangible comprising instructions of a 3D catalog mobile application that, when executed by a processor of a sales user device, cause the sales user device to perform operations including to display, using a 3D object renderer, a 3D product model of a 3D catalog, the 3D product model being encoded in a 3D modeling format, and overlay, over the 3D product model, a hotspot including an association of a location on the 3D product model with an element of product media related to an aspect of the 3D product model.

DETAILED DESCRIPTION

Figure 1:
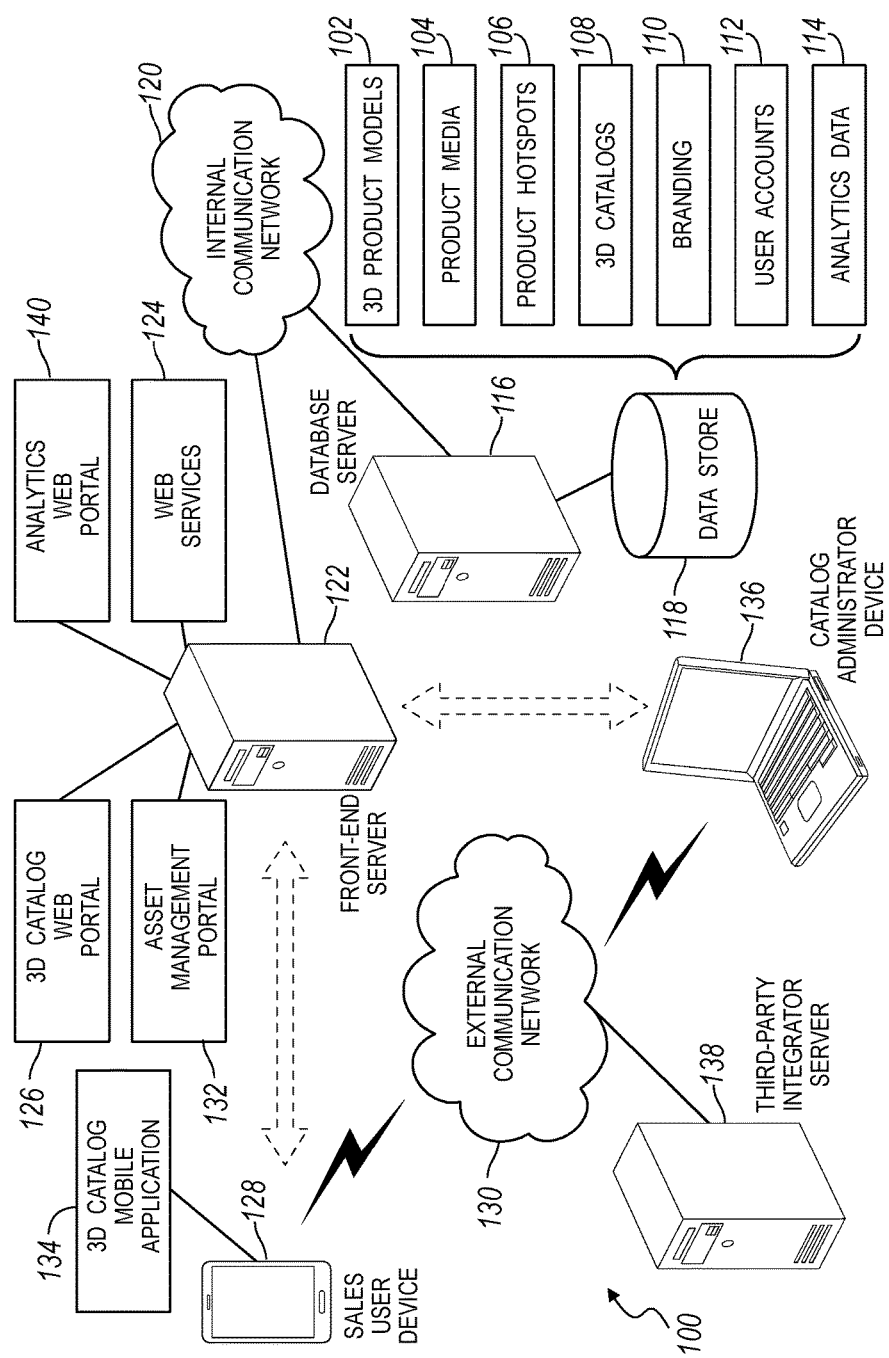
FIG. 1 illustrates an example system for providing configurable online 3D catalogs.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A catalog, such as a printed brochure, may include information regarding products available from a seller or reseller. A 3D catalog, in comparison, may refer to an electronic catalog configured to display 3D rendered images of catalog products. A 3D catalog mobile application may be used to view the 3D catalog, and may utilize object rendering technology to display movable, rotatable, and resizable 3D product models controllable by its users. The interactive 3D product models may also be overlaid with hotspots placed at locations on the 3D product model and configured to show additional product information when selected. Thus, the interactive 3D product models may allow the user to gain a better visual understanding of the product than might otherwise be available using traditional 2D imaging techniques. In some implementations the 3D catalog viewer may be a downloadable application, while in other implementations the 3D catalog viewer may be accessible via a web browser. The 3D catalog application may be utilized, in an example, by members of a sales force to illustrate available products to sales customers.

A 3D catalog system may include a server component configured to provide the 3D catalogs, 3D product models, and other catalog assets to the 3D catalog mobile application. In an example, the 3D catalog may be configured to access the server component to download and cache the 3D catalog asset information, thereby allowing for an up-to-date catalog experience while also avoiding network latency issues when the 3D catalog is in use.

The 3D catalog system may further include an asset management portal application configured to facilitate management of the 3D catalogs. The asset management portal may be configured to allow an administrative user to create users, manage user permissions to catalogs, create and update catalogs, assign and update products of the catalogs, configure and brand catalogs and products (e.g., for a particular user, salesperson, vendor, promotion, etc.), configure application interactions, upload 3D models of the catalog products, and upload other product media that may be linked to configurable hotspots on the 3D models of the catalog products.

To ensure security of the system, the 3D catalog may utilize a secure web service through which authenticated catalog administrators may edit the catalogs and product assets. In some examples, the system may further allow for third-party catalog integrators to utilize the secure web service as asset managers to automate their product and catalog updates.

Thus, the content management interface and 3D product viewer of the 3D catalog system may allow catalog administrators to reuse their existing 3D product models and other product assets to provide 3D catalogs of their products, avoiding requirements such as sophisticated website maintainers or the use of third-party vendors to photographically capture a series of 2D product images.

FIG. 1 illustrates an example system 100 for providing configurable online 3D catalogs 108. As illustrated, the system 100 includes a database server 116 hosting a secure data store 118 maintaining 3D product models 102, product media 104, product hotspots 106, 3D catalogs 108, branding 110, user accounts 112, analytics data 114, and possibly other non-product assets. The system 100 further includes a front-end server 122 hosting secure web services 124, a 3D catalog web portal 126, and an asset management portal 132. The front-end server 122 may be configured to access the database server 116 over an internal communication network 120 via the web services 124. Using the secure data store 118, the front-end server 122 may be configured to make the 3D catalog web portal 126 available over an external communication network 130 to sales user devices 128 via a web browser or a 3D catalog mobile application 134. The front-end server 122 may also be configured to make the asset management portal 132 available to catalog administrator devices 136 and third-party integrator servers 138 over the external communication network 130. As explained in detail below, the system 100 may be configured to receive product models 102 and product media 104 regarding the products and/or services via the asset management portal 132, and use those existing product assets to provide up-to-date 3D catalogs for users of the 3D catalog mobile application 134.

The 3D product models 102 may include various types of computer data in a 3D modeling format useful for the rendering of 3D computer graphics of a product. The 3D product models 102 may include, for example, one or more polygon models or meshes in the shape of the product. The 3D product models 102 may also include texture image files that may be mapped onto the surface of the model and/or shader instructions descriptive of how the model should be displayed. As another possibility, the 3D product models 102 may include non-uniform rational B-spline (NURBS) surfaces created through the use of Bezier curves. The 3D product models 102 may be encoded, as some examples, in one or more of various computer-aided design (CAD) model formats or 3D model interchange formats. As some non-limiting examples, the 3D product models 102 may include one or more of: 3DMF QuickDraw 3D Metafiles (.3dmf), FBX Autodesk models (.fbx), LWO Lightwave Objects (.lwo), ANEE 3D Flash Gallery Models (.u3d), Wavefront (.OBJ) files, Autodesk 3DS Max (.3ds) files, and DirectX 3D Models (.x).

In some cases, the 3D product models 102 may include animations of the 3D product models 102. In an example, an animation may include a sequence in which the components of the 3D product model 102 are disassembled or exploded apart. In another example, an animation may include a sequence in which the 3D product model 102 is illustrated in operation, such as with gears turning or other moving components interacting with one another in their intended fashion.

The product media 104 may include various types of supporting product assets useful for providing additional information regarding an associated 3D product model 102. As some non-limiting examples, the product media 104 may include written documentation regarding the associated product (e.g., in portable document format (PDF), Microsoft Word document format (DOC), etc.), still images or image details of various aspects of the product, links to external web content regarding the product, and movies or testimonials of advantages or other aspects of the product that may not be readily identifiable upon viewing the product.

The product hotspots 106 may include information related to 3D locations on the 3D product models 102 in which additional actions may be available. For example, the product hotspots 106 may include locations on the 3D product models 102 at which with elements of product media 104 are associated. The product hotspots 106 may be displayed as indications overlaid on the 3D product model 102 that, when selected, are configured to display the associated elements of product media 104.

The 3D catalogs 108 may be configured to act as containers for associated catalog information. For example, the 3D catalog 108 may be associated with or may otherwise reference one or more 3D product models 102 configured for inclusion in the 3D catalog 108. The 3D catalogs 108 may additionally be associated with various catalog attributes. As some possibilities, the catalog attributes may include one or more of a name of the 3D catalogs 108, whether or not the 3D catalogs 108 is enabled for viewing, indications of one or more users or types of users given access to the 3D catalogs 108, and whether the catalog is a default catalog initially opened for a given user.

The branding 110 may include non-product assets that may be used to identify a brand or category of catalog content. In some cases, the 3D catalogs 108 may be further associated with one or more element of branding 110. As one possibility, the branding 110 may include a logo indicative of the origin of the 3D catalog 108 itself, such as a name of a company publishing the catalog. As another possibility, the branding 110 may include a graphic indicative of the type of catalog, e.g., a catalog for chairs may be branded with a chair graphic.

The user accounts 112 may include information regarding authorized users of the system 100. For example, the user accounts 112 may include access permissions regarding which users of the system 100 have access to view and/or modify which 3D catalogs 108. The user accounts 112 may further include authentication information, such as usernames, passwords, encryption keys, challenge questions, or other information that may be used to authenticate users with the system 100.

The analytics data 114 may include information regarding the user interactions with the system 100. As one aspect, the analytics data 114 may include user session information, such as who, what, where, and when a user logged into the system 100. As another aspect, the analytics data 114 may include event information, such as information regarding click actions, drag actions, zoom actions, etc. performed by users of the system 100 when interacting with displayed 3D product models 102 and 3D catalogs 108.

The database server 116 may include various types of computing apparatus, such as a computer workstation, a server, a desktop computer, a virtual server instance executed by a mainframe server, or some other computing system and/or device. Computing devices, such as the database server 116, generally include a memory on which computer-executable instructions may be maintained, where the instructions may be executable by one or more processors of the computing device. Such instructions and other data may be stored using a variety of computer-readable media. A computer-readable medium (also referred to as a processor-readable medium or storage) includes any non-transitory (e. g., tangible) medium that participates in providing data (e.g., instructions) that may be read by a computer (e.g., by the processor of the database server 116). In general, processors receives instructions, e.g., from the memory via the computer-readable storage medium, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Java Script, Perl, PL/SQL, etc.

The data store 118 may be one such application included on the storage of the database server 116. The data store 118 may include instructions that, when loaded into memory and executed by the database server 116, cause the database server 116 to perform database functionality including the storage, update, and retrieval of relational information. Databases or data repositories such as the data store 118 may include various kinds of mechanisms for storing, accessing, and retrieving various kinds of data, including a hierarchical database, a set of files in a file system, an application database in a proprietary format, a relational database management system (RDBMS), etc. The data store 118 may employ features of the computer operating system of the database server 116, and may be accessed via the internal communication network 120 in a variety of manners. The data store 118 may also utilize the file system via the computer operating system, and may store and retrieve files stored in various formats. An RDBMS generally employs the known Structured Query Language (SQL) in addition to a language for creating, storing, editing, and executing stored procedures, such as the PL/SQL language mentioned above. More specifically, the data store 118 may be configured to maintain information including the 3D product models 102, product media 104, 3D catalogs 108, branding 110, and user accounts 112.

The internal communication network 120 may be configured to facilitate secure communication between internal devices of the system 100. Accordingly, the internal communication network 120 may provide communication services between the database server 116 and the front-end server 122. As one aspect of providing security for the communications, the internal communication network 120 may limit or exclude communications from devices other than the internal devices (e.g., database server 116 and the front-end server 122). Thus, the data store 118 may be configured to maintain information such that it may be accessible only by authorized parties. Additionally or alternately, the internal communication network 120 may be configured to support encryption of communications between the internal devices.

Similar to as discussed above with respect to the database server 116, the front-end server 122 may include various types of computing apparatus including a memory on which computer-executable instructions may be maintained, where the instructions may be executable by one or more processors of the computing device. The front-end server 122 may be configured to maintain the web services 124 configured to facilitate secure access to the data stored by database server 116, maintain the 3D catalog web portal 126 accessible to sales user devices 128 over the external communication network 130, and maintain the asset management portal 132 accessible to catalog administrator devices 136 and third-party integrator servers 138 over the external communication network 130.

The web services 124 may be an application programming interface (API) accessible via the front-end server 122 to users of the system 100. The web services 124 may be configured to provide access to the data stored the database server 116 based on the user account 112 of the user or application requesting access. It should be noted that while the 3D catalog web portal 126 and the asset management portal 132 may be executed in whole or in part by the front-end server 122 (or other system-controlled computing devices), the 3D catalog web portal 126 and the asset management portal 132 may still make use of the web services 124 to achieve data access to the database server 116, similar to as would be done by other client applications configured to access the database server 116, such as the 3D catalog mobile application 134 of the sales user device 128.

The 3D catalog web portal 126 may be an application or library included on the storage of or otherwise accessible to the front-end server 122. The 3D catalog web portal 126 may include an interface to the system 100 provided by the front-end server 122 and accessible by sales users. When accessed, the 3D catalog web portal 126 may be configured to allow the sales force user to access and view the 3D catalogs 108 and associated 3D product models 102 stored by the data store 118.

The sales user devices 128 may include various devices usable by sales users to access the 3D catalog web portal 126 provided by the front-end server 122 over the external communication network 130. The external communication network 130 may include one or more interconnected communication networks such as the Internet, a cable television distribution network, a satellite link network, a local area network, a wide area network, and a telephone network, as some non-limiting examples. Similar to as discussed above with respect to other devices, the sales user devices 128 may include various types of computing apparatus including a memory on which computer-executable instructions may be maintained, where the instructions may be executable by one or more processors of the computing device. The sales user devices 128 may include laptop computers, tablet or other handheld computers, mobile phones, computer workstations, servers, desktop computers, or some other computing system and/or device.

In an example, the sales user devices 128 may be configured to access the 3D catalog web portal 126 by using a web browser application. As another possibility, the sales user devices 128 may execute the 3D catalog mobile application 134, or "app", configured to provide access to the 3D catalog web portal 126. In some cases, the 3D catalog mobile application 134 may be downloaded from an application store such as the App Store provided by Apple, Inc. of Cupertino, Calif., or the Google Play store provided by Google, Inc. of Mountain View, Calif.

The 3D catalog mobile application 134 may be configured to utilize 3D rendering technology (e.g., the Unity 3D engine distributed by Unity Technologies of San Francisco, Calif.) to display the 3D product models 102 of the 3D catalogs 108. In some cases, the 3D catalog mobile application 134 may access the 3D catalog web portal 126 live to receive the 3D product models 102 and 3D catalogs 108. In other examples, the 3D catalog mobile application 134 may additionally or alternately be configured to maintain a cache of the 3D products models 102 and associated product media 104 for the 3D catalogs 108, thereby allowing the 3D catalog mobile application 134 to present the 3D catalog without requiring a live connection over the external communication network 130. The 3D catalog mobile application 134 may update its cache of 3D catalogs 108 under various conditions, such as when invoked, when a connection to the external communication network 130 is detected, or upon express user input, as some possibilities.

The asset management portal 132 may be another application or library included on the storage of or otherwise accessible by the front-end server 122. The asset management portal 132 may include an interface to the system 100 provided by the front-end server 122 and accessible by system administrators, such as customers utilizing the services of the system 100 for their online catalogs. When accessed by the administrator, the asset management portal 132 may be configured to allow users to update aspects of the 3D catalog 108 information maintained by the data store 118, such as to add or remove 3D product models 102 from the system 100, add or remove associated product media 104 from the 3D product models 102, and add or remove associations of 3D product models 102 with the catalogs 108. Similar to the sales user devices 128, the administrator devices 136 may include various devices usable by administrators to access the asset management portal 132 provided by the front-end server 122 over the external communication network 130. Also similar to the sales user devices 128, the administrator devices 136 may include laptop computers, tablet or other handheld computers, mobile phones, computer workstations, servers, desktop computers, or some other computing system and/or device.

The third-party integrator server 138 may be another device configured to access the front-end server 122 over the communication network 130. The third-party integrator server 138 may be a type of administrator device 136 configured to perform automated updates to the 3D catalogs 108 and 3D product models 102. In an example, the third-party integrator server 138 may be configured to utilize the user account 112 of a user of the system 100 to log into the asset management portal 132, which may allow the third-party integrator server 138 to utilize the web services 124 to perform scripted actions to the 3D catalogs 108 associated with the user account 112. Further aspects of the 3D catalog system 100 are discussed in detail with respect to the FIGS. 2-10 below.

The analytics web portal 140 may be another application or library included on the storage of or otherwise accessible to the front-end server 122. The analytics web portal 140 may include an interface to the system 100 provided by the front-end server 122 and accessible by administrative or other users having analytics access according to their user accounts 112. When accessed, the analytics web portal 140 may be configured to access the data store 118, via the web services 124, to allow the user to access a comprehensive analytics dashboard from which custom reports may be created using the analytics data 114. As one possibility, the analytics web portal 140 may be configured to allow the user to view information regarding which 3D catalogs 108 and 3D product models 102 stored by the data store 118 were accessed by which user accounts 112 and when those accesses took place. As another possibility, the analytics web portal 140 may be configured to allow the user to view information regarding which product hotspots 106 of which 3D product models 102 stored by the data store 118 were selected by which user accounts 112 and when those accesses took place. As additional possibilities, the analytics web portal 140 may be configured to allow the user to view information regarding which textures or other configurable features of a 3D product model 102 were selected, or what aspects of the sizing of a 3D product model 102 were measured by the user. As another possibility, the analytics web portal 140 may be configured to allow the user to view information about where a user initiated a mobile session and how long the session lasted.

Figure 2:
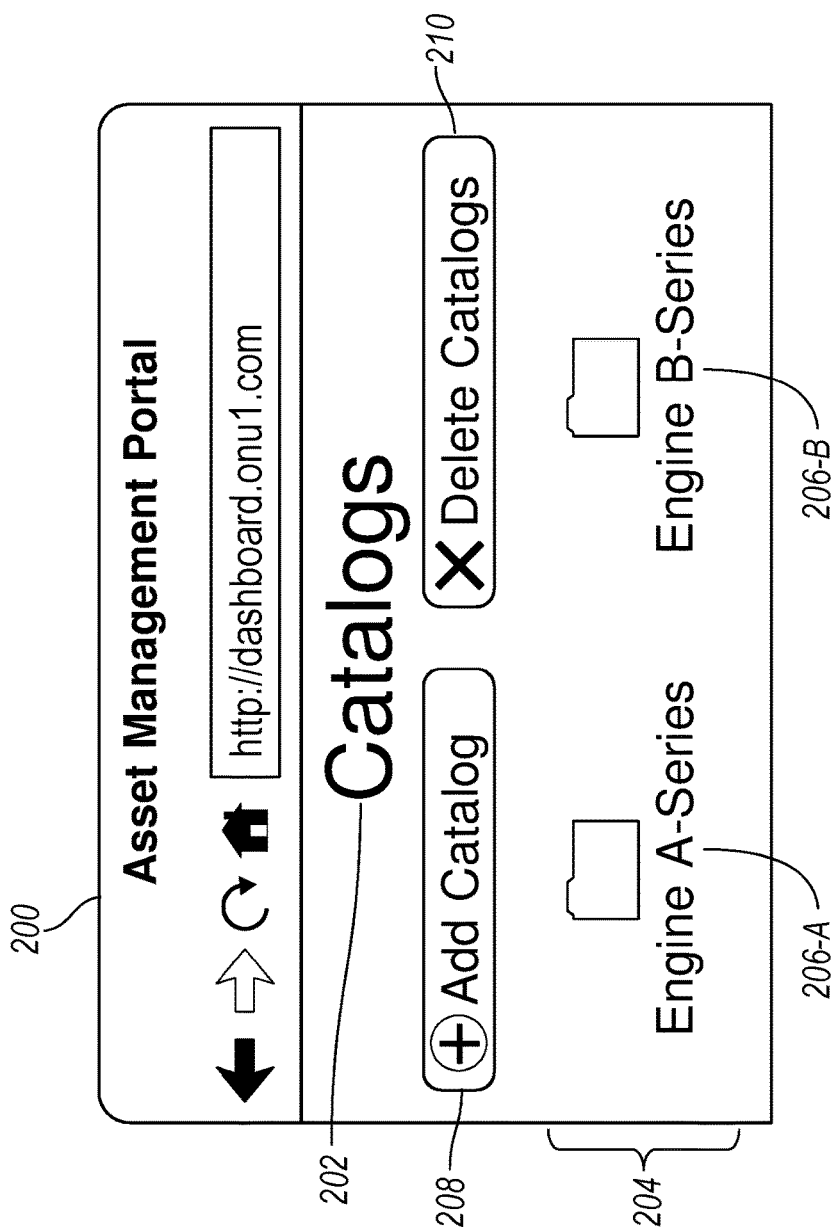
FIG. 2 illustrates an example user interface for adding or removing 3D catalogs from the system.

FIG. 2 illustrates an example user interface 200 for adding or removing 3D catalogs 108 from the system 100. The user interface 200 may be presented, for example, on a display of the catalog administrator device 136 accessing the asset management portal 132 of the front-end server 122. The user interface 200 may be provided by the front-end server 122, for example, responsive to a user logging into the asset management portal 132 using his or her user account 112 credentials, and selecting to perform maintenance operations on the 3D catalogs 108 of the system 100.

As illustrated, the user interface 200 may be provided by the front-end server 122 as a web page user interface to a catalog administrator device 136 utilizing a web browser application to connect to a universal resource locator (URL) of the asset management portal 132. However, it should be noted that, in other examples, the user interface 200 may be provided by way of a dedicated application, such as the 3D catalog mobile application 134 or a separate administrative application, logging into the asset management portal 132 of the front-end server 122 or directly accessing the web services 124 of the front-end server 122.

Regardless of the specific client being used, the user interface 200 may include a title label 202 to indicate to the user that the user interface 200 is for utilizing the "catalog" maintenance features of the asset management portal 132. The user interface 200 may further include a catalog list 204 configured to display selectable indications 206 of the 3D catalogs 108 stored in the data store 118 that are available for editing by the logged-in user account 112. As illustrated, the catalog list 204 includes an indication 206-A for an "Engine A-Series" 3D catalog 108, and an indication 206-B for an "Engine B-Series" 3D catalog 108. When an indication 206 is selected (e.g., by a user of the asset management portal 132 clicking or touching one of the indications 206), the catalog administrator device 136 may send a command via the external communications network 130 to the front-end server 122, to cause the front-end server 122 to initiate configuration of the 3D catalog 108 corresponding to the selected indication 206.

The user interface 200 may further include additional controls that may be used to manage the available 3D catalogs 108. For example, as illustrated the user interface 200 includes an add catalog control 208, that when selected, allows the user to create a new 3D catalog 108. As another example, as illustrated the user interface 200 includes a delete catalog control 210, that when selected, allows the user to delete an existing 3D catalog 108.

Figure 3:
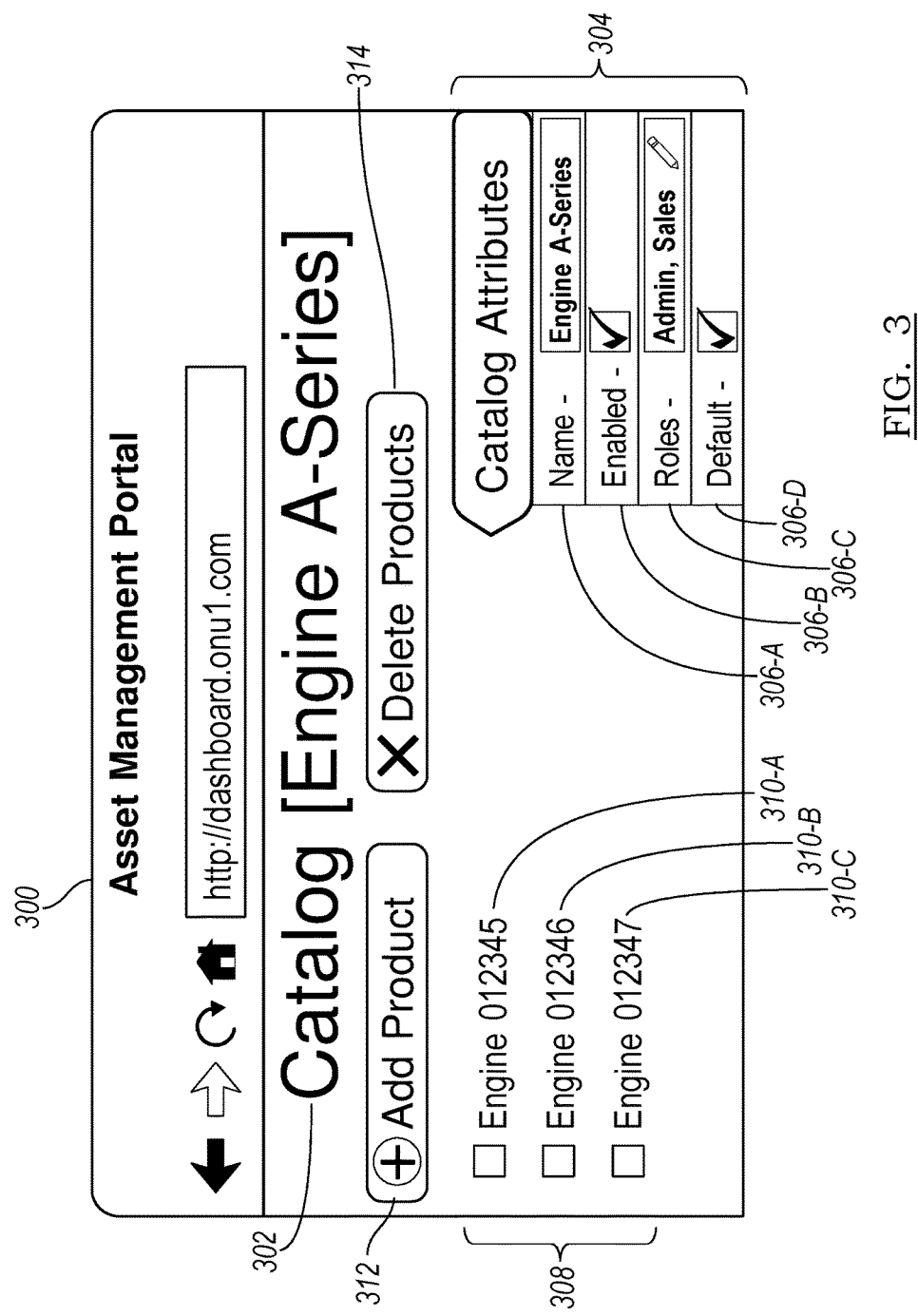
FIG. 3 illustrates an example user interface for configuring 3D products models of a 3D catalog selected for editing.

FIG. 3 illustrates an example user interface 300 for configuring 3D products models 102 of a 3D catalog 108 selected for editing. As with the user interface 200, the user interface 300 may be presented, for example, on the display of the catalog administrator device 136 accessing the asset management portal 132 of the front-end server 122. The user interface 300 may be presented, for example, responsive to selection of an indication 206 of a 3D catalog 108 from the user interface 200 for editing.

The user interface 300 may include a title label 302 to indicate to the user that the user interface 300 is for editing the selected 3D catalog 108. For example, as illustrated the title label 302 indicates that the "Engine A-Series" catalog is currently being edited (e.g., responsive to selection of the indication 206-A from the user interface 200).

The user interface 300 may include catalog attribute controls 304 that may be used to edit the attributes of the 3D catalog 108 being edited. For example, the user interface 300 may include a catalog name control 306-A from which a user may view and edit the name attribute of the 3D catalog 108, a catalog enabled control 306-B from which a user may view and edit the enabled status of the 3D catalog 108 (i.e., whether the 3D catalog 108 is available for viewing by sales user devices 128), a catalog roles control 306-C from which a user may view and edit the roles attribute of the 3D catalog 108 (i.e., which types of users accounts 112 may be configured to access to the 3D catalog 108), and a catalog default control 306-D from which a user may view and edit the default attribute of the 3D catalog 108 (i.e., whether the 3D catalog 108 should be the 3D catalog 108 opened by default for users of the sales user devices 128).

The user interface 300 may also include a product list 308 that may be used select 3D products models 102 from the data store 118 for inclusion in the 3D catalog 108 being edited. As illustrated, the product list 308 includes an indication 310-A for an "Engine 012345" 3D products model 102, an indication 310-B for an "Engine 012346" 3D products model 102, and an indication 310-C for an "Engine 012347" 3D products model 102. For instance, if the user wishes to add the "Engine 012346" 3D products model 102 to the "Engine A-Series" 3D catalog 108, then the user may select the indication 310-B checkbox, and then select the add product control 312. As another example, if the user would like to remove the "Engine 012345" 3D products model 102 from the "Engine A-Series" 3D catalog 108, then the user may select the indication 310-A checkbox, and then select the remove product control 314.

The user interface 300 may further allow the user to select to configure the 3D products models 102. For example, when an indication 310 is selected (e.g., by a user of the asset management portal 132 clicking or touching the underlined link of one of the indications 310), the catalog administrator device 136 may send a command via the external communications network 130 to the front-end server 122, to cause the front-end server 122 to initiate configuration of the 3D products model 102 corresponding to the selected indication 310.

Figure 4:
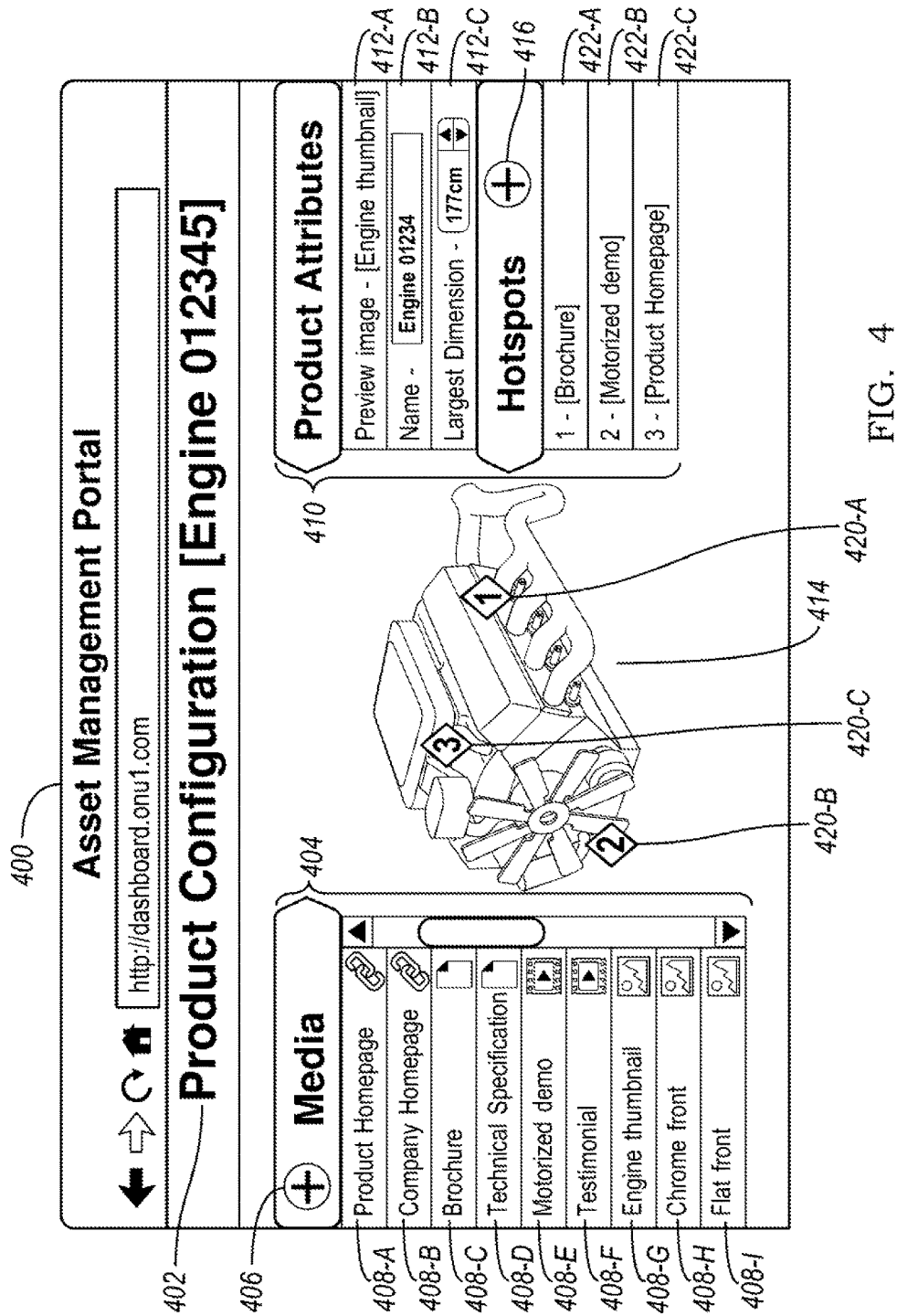
FIG. 4 illustrates an example user interface for configuring hotspots of the selected product of a 3D catalog.

FIG. 4 illustrates an example user interface 400 for configuring a 3D products model 102 selected for editing. As with the user interfaces 200 and 300, the user interface 400 may be presented, for example, on the display of the catalog administrator device 136 accessing the asset management portal 132 of the front-end server 122. The user interface 400 may be presented, for example, responsive to selection of an indication 310 of a 3D product model 102 for editing from the user interface 300.

The user interface 400 may include a title label 402 to indicate to the user that the user interface 400 is for editing the selected 3D product model 102. For example, as illustrated the title label 402 indicates that the "Engine 012345" 3D product model 102 is currently being edited (e.g., responsive to selection of the indication 310-A from the user interface 300).

The user interface 400 may include a media control 404 with which a user may upload and select various product media 104 to be associated with the selected 3D product model 102. For example, the media control 404 may include an add control 406 that may be selected by the user to allow the user to upload product media 104 to be stored in the data store 118 (or select from previously uploaded product media 104) to be associated with the selected 3D product model 102. The add control 406 may be used to specify product media 104 such as images, videos, documents, and/or web links (e.g., URLs).

The media control 404 may further include a list of selectable indications 408 of the product media 104 items stored in the data store 118 that are associated with the selected 3D product model 102. For example, the product media 104 uploaded and associated with the selected 3D product model 102 may include: (i) an indication 408-A of a web page from which information regarding the 3D product model 102 is available, (ii) an indication 408-B of a company homepage from which information regarding the company producing or distributing the 3D product model 102 is available, (iii) an indication 408-C of a brochure including information descriptive of the 3D product model 102, (iv) an indication 408-D of a technical specification including technical documentation regarding the 3D product model 102, (v) an indication 408-E of a motorized demonstration movie or 3D model animation of the 3D product model 102, (vi) an indication 408-F of a testimonial demonstration movie of a customer of the 3D product model 102 professing its merits, (vii) an indication 408-G of an engine thumbnail that may be provided in a user interface without requiring the relatively computationally-expensive rendering of the 3D product model 102 itself, (viii) an indication 408-H of a chrome front image that may be provided in a user interface to indicate a possible configuration or color of the 3D product model 102, and (ix) an indication 408-I of a flat front image that may be provided in a user interface to indicate an alternate possible configuration or color of the 3D product model 102.

The media control 404 may also support the modification and deletion of product media 104 associations with the 3D product model 102. As one possibility, when a user performs a selection of an indication 408 (e.g., a right-click action using a mouse or a touch-and-hold action using a touch-enabled interface), the media control 404 may provide a contextual menu including commands such as (i) rename product media 104, (ii) remove association of the element of product media 104 with the 3D product model 102, and (iii) remove the element of product media 104 from the data store 118.

The user interface 400 may also include product attribute controls 410 that may be used to edit the attributes of the 3D product model 102 being edited. For example, the user interface 400 may include a preview image control 412-A from which a user may select an uploaded preview image to be associated with the 3D product model 102 (e.g., one of the uploaded images of product media 104), a product name control 412-B from which a user may view and edit the name attribute of the 3D product model 102, and a largest dimension control 412-C from which a user may view and edit the longest length of the underlying 3D product model 102. The longest length of the 3D product model 102 may be useful, for example, to provide for scaling or default orientation selection for the 3D product model 102.

The user interface 400 may also facilitate user configuration of hotspots 106 on the 3D product model 102. For example, the user interface 400 may include a rendering control 414 configured to display a 3D rotatable and zoomable rendered image of the 3D product model 102 (e.g., using the Unity engine or other 3D renderer discussed above), and a hotspot control 416 with which hotspots 106 on the 3D product model 102 may be placed and associated with elements of product media 104.

As one possibility, when the hotspot control 416 is selected, the user interface 400 may be configured to receive a 2D location selection (e.g., a mouse click, a touch, etc.) from the current view of the 3D product model 102 in the rendering control 414. The user interface 400 may then determine the location on the 3D model for the hotspot 106 based on a mapping of the current 2D location selection onto a closest point of the 3D product model 102 to the indicated 2D location. For each added hotspot 106 location, the user interface 400 may provide (i) a hotspot indication 420 overlaid on the rendering control 414 (e.g., if the hotspot 106 is on the visible side of the 3D product model 102), and (ii) an indication 422 from which an element of product media 104 may be associated with the hotspot 106 (e.g., via selection of one of the elements of product media 104 uploaded using the media control 404).

For example, the user interface 400 may include an indication 422-A from which the brochure indication 408-C of product media 104 may be associated with the hotspot indication 420-A, an indication 422-B from which the motorized demo indication 408-E of product media 104 may be associated with the hotspot indication 420-B, and an indication 422-C from which the product homepage indication 408-A of product media 104 may be associated with the hotspot indication 420-C. Notably, the hotspot indications 420 and indications 422 may be referenced using like numbers or other information, to allow the user to easily identify which product media 104 is associated with which hotspot 106 locations.

Figure 5:
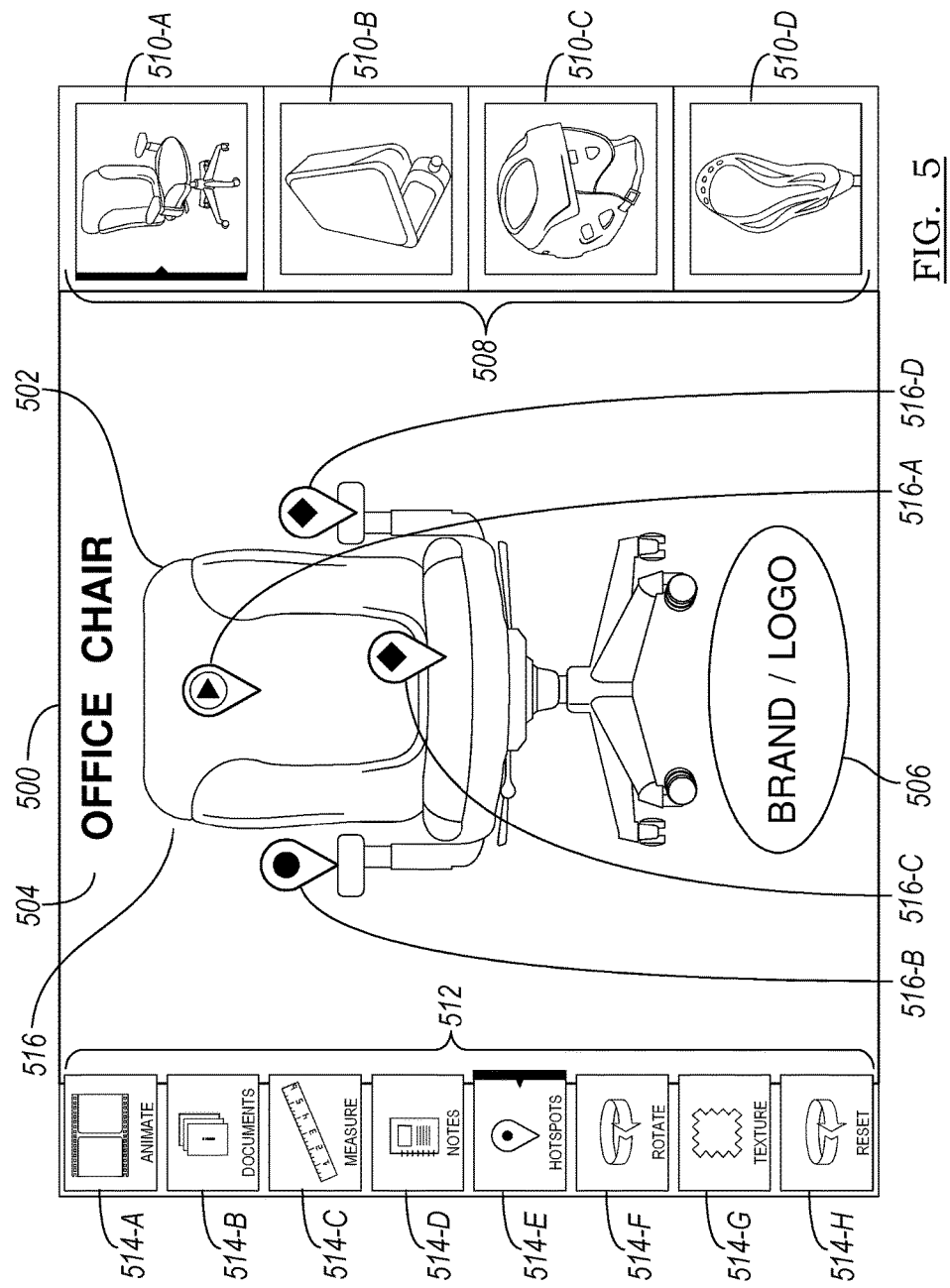
FIG. 5 illustrates an example user interface for viewing 3D products of a 3D catalog including a hotspot feature.

FIG. 5 illustrates an example user interface 500 for viewing 3D products models 102 of a 3D catalog 108 including a hotspot 106 feature. The user interface 500 may be presented, for example, on a display of the sales user device 128 by the 3D catalog mobile application 134. It should be noted that, in other examples, the user interface 500 may be provided by way of a web browser application connecting to a universal resource locator (URL) of the 3D catalog web portal 126. Use of the dedicated 3D catalog mobile application 134 may be preferable for a sales force user, however, as the 3D catalog mobile application 134 may be configured to maintain a cache of the 3D products models 102 of the 3D catalogs 108 to which the user account 112 of the sales force user is authorized, thereby allowing the 3D catalog mobile application 134 to present the 3D catalog without requiring a live connection over the external communication network 130. When the 3D catalog mobile application 134 is opened, the 3D catalog mobile application 134 may be configured to present the default catalog for the user account 112 in the user interface 500.

The user interface 500 may include a rendering control 502 configured to display a 3D rotatable and zoomable rendered image of a 3D product model 102. In an example, the rendering control 502 may be the Unity engine or another 3D renderer as discussed above. The rendering control 502 may be configured to receive touch gesture input to facilitate rotation and zooming of the presented 3D product model 102. In another example, the rendering control 502 may additionally or alternately be controlled via mouse, keyboard, or hard button input from the user of the sales user device 128. The user interface 500 may further include additional information regarding the presented 3D product model 102, such as a title control 504 in which a name of the displayed product is presented (e.g., a name of the product as illustrated), and a branding control 506 in which branding 110 information associated with the presented 3D product model or 3D catalog 108 itself may be displayed (e.g., a logo of the product manufacturer as illustrated).

The user interface 500 may further include a scrollable view control 508 of the 3D products models 102 available for browsing within the current 3D catalog 108. Each of the 3D products models 102 within the 3D catalog 108 may accordingly be included in the scrollable view control 502 as a thumbnail image 510 that may be selected by a user. The thumbnail image 510 of the product provided for user interface 500 may be the preview image selected by the catalog administrator using the preview image control 412-A, as discussed above. Preview images may accordingly allow for display of the thumbnail images 510 without requiring the user interface 500 to render each of the underlying 3D product models 102 of the products within the scrollable view control 508. As illustrated, the example 3D catalog 108 being viewed includes a thumbnail image 510-A of a chair 3D product model 102, a thumbnail image 510-B of a portable charger 3D product model 102, a thumbnail image 510-C of a lacrosse helmet 3D product model 102, and a thumbnail image 510-D of a lacrosse stick 3D product model 102. The scrollable view control 508 may further display an indication of which 3D product model 102 is currently selected for viewing in the rendering control 502. As illustrated, the thumbnail image 510-A is currently indicated as being selected for viewing in the rendering control 502.

The user interface 500 may also include a set of feature controls 512 configured to allow the user to select various features related to the 3D product model 102 currently selected for viewing. As some examples, the feature controls 512 may include: (i) an animate control 514-A configured to cause the rendering control 502 to display an animation associated with or included within the 3D product model 102 (e.g., a sequence in which the components of the 3D product model 102 are disassembled or exploded apart, a sequence in which the 3D product model 102 is illustrated in operation, etc.), (ii) a documents control 514-B configured to cause the user interface 500 to display a listing of the product media 104 items stored in the data store 118 that are associated with the selected 3D product model 102, (iii) a measure control 514-C configured to provide information regarding 3D product model 102 dimensions (discussed in detail with respect to the user interface 600 of below), (iv) a notes control 514-D configured to cause the user interface 500 to display a notepad control into which the user may enter textual information for later viewing or export (e.g., via e-mail, upload to the data store 118, etc.), (v) a hotspots control 514-E configured to invoke display of the hotspots 106 configured for the 3D product model 102 (as illustrated as a selected feature in the user interface 500), (vi) a rotate control 514-F configured to invoke a default rotation of the 3D product model 102 to facilitate its viewing, (vii) a texture control 514-G configured to invoke selection of color or texture customizations of the 3D product model 102 (discussed in detail with respect to the user interface 700 of below), and (viii) a reset control 514-H configured to cause the rendering control 502 to return the 3D product model 102 to an initial level of zoom, rotation, and/or texture.

As the hotspots control 514-E indicates that display of hotspots 106 is invoked, the user interface 500 further includes hotspot indications 516 overlaid on the currently displayed 3D product model 102 (e.g., as configured using the user interface 400 discussed above). As discussed above with respect to the administrative user interface 400, each hotspot 106 may relate to a 3D location on the 3D product model 102 and may be associated with an element of product media 104. As the hotspots 106 are associated with 3D locations relative to the 3D product model 102, the rendering control 502 is configured to cause the hotspot 106 icons to rotate along with the 3D product model 102.

When a hotspot indication 516 is selected in the user interface 500, the user may accordingly be able to view the associated element of product media 104 in the user interface 500, thereby providing information about an aspect of the 3D product model relating to the selected product location. In some cases, the hotspot indication 516 may include an icon indicative of the type of product media 104 associated with the particular hotspot 106 (e.g., whether the hotspot 106 includes an informational popup, a link, a photo, a video, etc.). As illustrated, the hotspot indication 516-A includes a play icon indicating that the hotspot indication 516-A is associated with a movie element of product media 104, the hotspot indication 516-B includes a circle icon indicating that the hotspot indication 516-B is associated with a textual information element of product media 104, and each of the hotspot indications 516-C, 516-D includes a diamond icon indicating that the respective hotspot indications 516-C, 516-D are each associated with photo elements of product media 104 (e.g., a single photo, a series of photos displayed in a "cover flow" type format, etc.).

In addition to the aforementioned features, the user interface 500 may be configured to log user session information and user interactions with the user interface 500. The user session information may include, for example, who, what, where, and when a user logged into the system 100 (e.g., from what user account 112, from what Internet protocol (IP) or other originating address, from what sales user device 128, duration of the login session, etc.) The user interactions may include drag actions and zoom actions performed on the rendering control 502, click actions performed on the various feature controls 512, interactions with hotspot indication 516, as some possibilities. The user interface 500 may further provide this logged information back to the front-end server 122, which may utilize the web services 124 to store the information to the data store 118 as analytics data 114.

Figure 6:
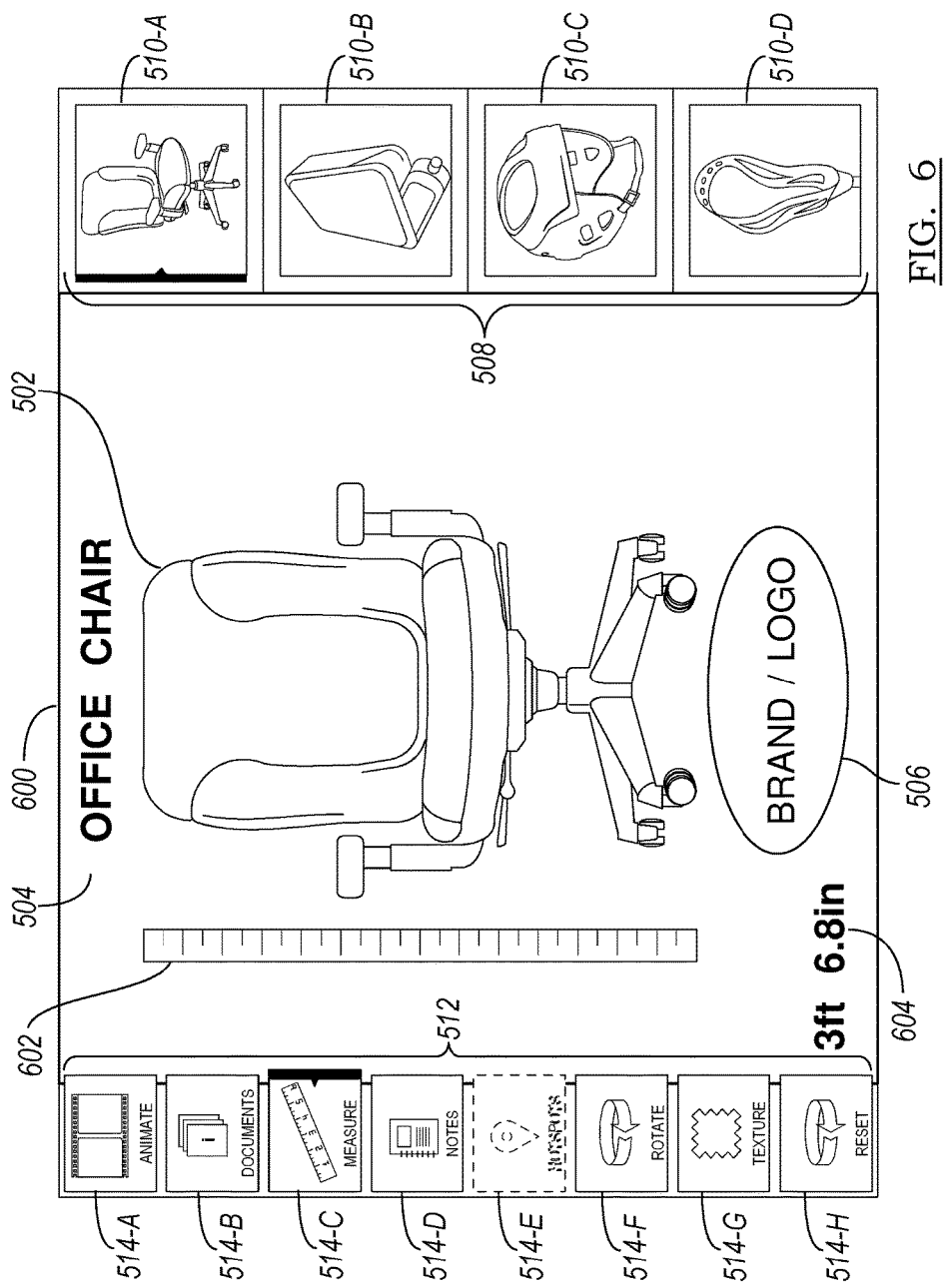
FIG. 6 illustrates an example user interface for viewing 3D products of a 3D catalog including a measure feature.

FIG. 6 illustrates an example user interface 600 for viewing 3D products models 102 of a 3D catalog 108 including a measure feature. The user interface 600 may be presented, for example, on the display of the sales user device 128 by the 3D catalog mobile application 134, responsive to user selection of the measure control 514-C configured to provide information regarding 3D product model 102 dimensions.

By way of the measure feature, the rendering control 502 may be configured to further render a ruler control 602 configured to facilitate measurement of the 3D product model 102 currently being displayed in the user interface 600. In an example, the ruler control 602 may be displayed in a relatively fixed position, and may provide for measurement of the maximum extent of the 3D product model as currently oriented in the direction of the ruler control 602. The rendering control 502 may be further configured to display the particular value being measured in a measurement control 604. For instance, as illustrated the maximum extent of the chair oriented vertically across the axis of the ruler control 602 is illustrated in the measurement control 604 as "3 ft 6.8 in." The maximum extent may accordingly adjust as the user changes the orientation of the 3D product model 102, but would not change as the user adjusts the zoom level.

In some examples, the hotspot 106 functionality may be disabled during use of the measurement feature, to facilitate a clearer identification of the dimension being measured. Variations on the function of the measure feature are possible. In an example, the ruler control 602 may be moveable with respect to the 3D product model 102, to allow for measurement of various elements or sub-elements of the 3D product model 102. The user interface 600 may further provide information regarding what aspect of the 3D product model 102 was measured back to the front-end server 122 for inclusion in the analytics data 114.

Figure 7:
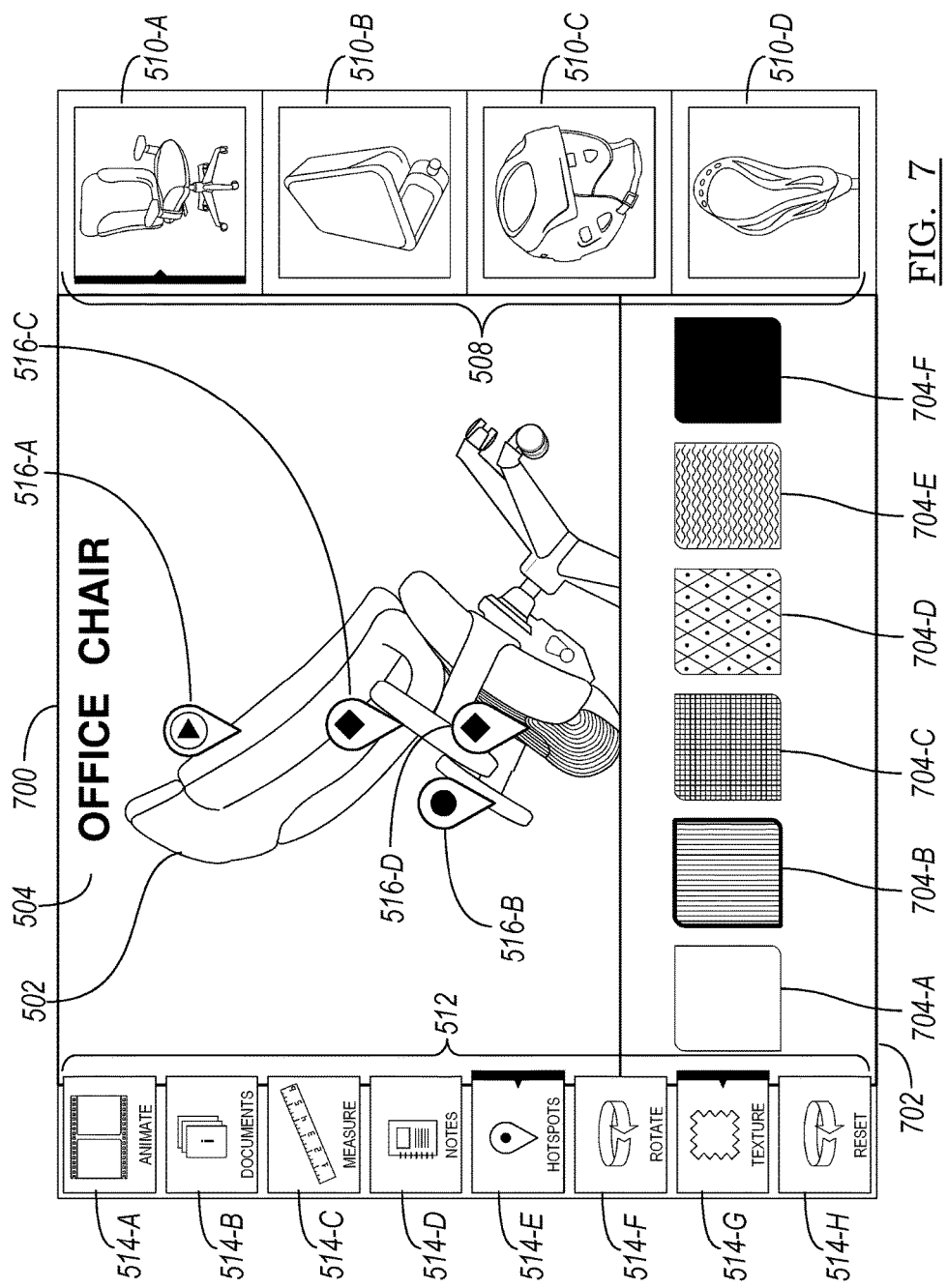
FIG. 7 illustrates an example user interface for viewing 3D products of a 3D catalog including a texture feature.

FIG. 7 illustrates an example user interface 700 for viewing 3D products models 102 of a 3D catalog 108 including a texture feature. The user interface 700 may be presented, for example, on the display of the sales user device 128 by the 3D catalog mobile application 134, responsive to user selection of the texture control 514-G configured to invoke selection of color or texture customizations of the 3D product model 102. The texture feature may be useful for users in viewing different options that may be available for a particular product.

In the texture feature, the rendering control 502 may be configured to further display a texture selection control 702 configured to facilitate selection of color or texture options available for the 3D product model 102 being displayed in the user interface 700. In an example, the texture selection control 702 may be displayed at the bottom of the user interface 700, and may include one or more texture indications 704 of options for the displayed 3D product model 102. As shown, the texture indication 704-A indicates a solid pattern for the seat material for the chair displayed as the 3D product model 102, the texture indication 704-B indicates a first patterned material (selected for display as illustrated by the indication 704-B highlighting and in the rendered chair), the texture indication 704-C indicates a second patterned material, the texture indication 704-D indicates a third patterned material, the texture indication 704-E indicates a fourth patterned material, and the texture indication 704-F indicates a fifth patterned material. The user interface 700 may further provide information regarding what was texture indication 704 was selected for view to the front-end server 122 for inclusion in the analytics data 114.

Figure 8:
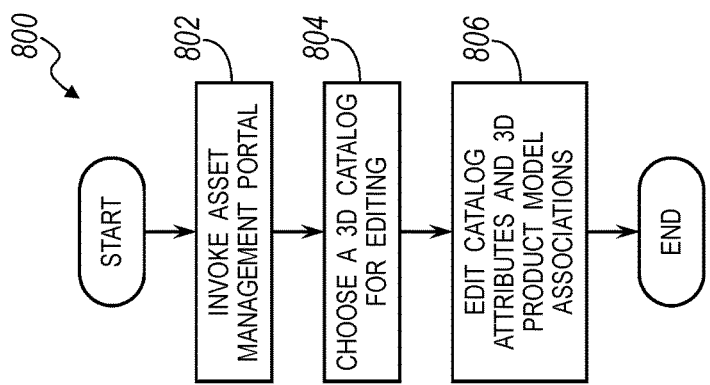
FIG. 8 illustrates an example process for invoking the asset management portal to configure a 3D catalog.

FIG. 8 illustrates an example process 800 for invoking the asset management portal 132 to configure a 3D catalog 108. The process 800 may be performed, for example, by the asset management portal 132 of the front-end server 122 receiving input from the administrator device 136.

At operation 802, the administrator device 136 receives an indication from the user to invoke the asset management portal 132. In an example, a user of the administrator device 136 may utilize a web browser application of the catalog administrator device 136 to access the asset management portal 132 of the front-end server 122. The user interface 200 may be provided by the front-end server 122, for example, responsive to a user logging into as web interface of the asset management portal 132 using his or her user account 112 credentials, and selecting to perform maintenance operations on the 3D catalogs 108 of the system 100.

At operation 804, the asset management portal 132 receives an indication from the user of a catalog to edit. In an example, the asset management portal 132 may present a user interface such as the user interface 200 discussed in detail above, and may receive from the administrator device 136 an indication of a catalog to edit (e.g., by a user of the asset management portal 132 clicking or touching one of the indications 206). When an indication 206 is selected, the catalog administrator device 136 may send a command via the external communications network 130 to the front-end server 122, to cause the front-end server 122 to initiate configuration of the 3D catalog 108 corresponding to the selected indication 206.

At operation 806, the asset management portal 132 provides for the editing of catalog attributes and associated 3D product models 102. In an example, the asset management portal 132 may present a user interface such as the user interface 300 discussed in detail above, for the editing of catalog attributes and associations of 3D product models 102 with the 3D catalog 108. The user interface 300 may be presented, for example, responsive to selection of an indication 206 of a 3D catalog 108 from the user interface 200 for editing. The asset management portal 132 may facilitate editing of catalog attributes such as catalog name, whether the 3D catalog 108 is available for viewing by sales user devices 128, which types of users accounts 112 may be configured to access to the 3D catalog 108, and whether the 3D catalog 108 should be the 3D catalog 108 opened by default for users of the sales user devices 128. The asset management portal 132 may also facilitate the uploading, addition, and removal of 3D products 102 from the 3D catalog 108 being edited. After operation 806, the process 800 ends.

Figure 9:
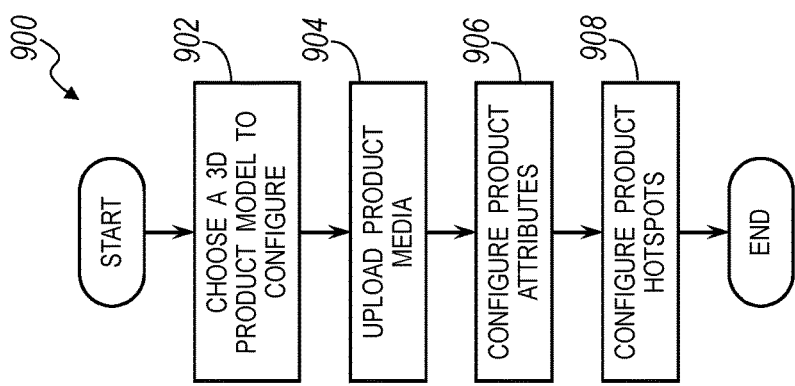
FIG. 9 illustrates an example process for utilizing the asset management portal to configure a 3D product of the 3D catalog.

FIG. 9 illustrates an example process 900 for utilizing the asset management portal 132 to configure a 3D product 102 of the 3D catalog 108. As with the process 800, the process 900 may be performed, for example, by the asset management portal 132 of the front-end server 122 receiving input from the administrator device 136.

At operation 902, the asset management portal 132 receives a selection of a 3D product model 102 to configure. In an example, the asset management portal 132 may present a user interface, such as the user interface 400 discussed in detail above, for the editing of 3D product models 102. The user interface 400 may be presented, for example, responsive to selection of an indication 310 of a 3D product model 102 for editing from the user interface 300.

At operation 904, the asset management portal 132 uploads product media 104 for the 3D product model 102. In an example, the asset management portal 132 may receive user selections of images, videos, documents, and/or web links to be stored in the data store 118 (or select from previously uploaded product media 104) and associated with the 3D product model 102 being configured.

At operation 906, the asset management portal 132 configures the 3D product model 102 attributes. In an example, the asset management portal 132 may receive user selections via product attribute controls 410 that may be used to edit the attributes of the 3D product model 102 being edited. These product attributes may include, for example, a preview image to be associated with the 3D product model 102, a name attribute of the 3D product model 102, and a largest dimension of the underlying 3D product model 102.

At operation 908, the asset management portal 132 configured hotspots 106 of the 3D product model 102. In an example, the asset management portal 132 may receive user selections via the hotspot control 416 of the user interface 400 that may be used to allow the asset management portal 132 to receive a 2D location selection from the current view of the 3D product model 102 in the rendering control 414, from which a 3D location on the 3D model for the hotspot 106 may be determined by the system 100. The hotspot control 416 may further allow the user to specify an element of product media 104 may be associated with the hotspot 106. After operation 908, the process 900 ends.

Figure 10:
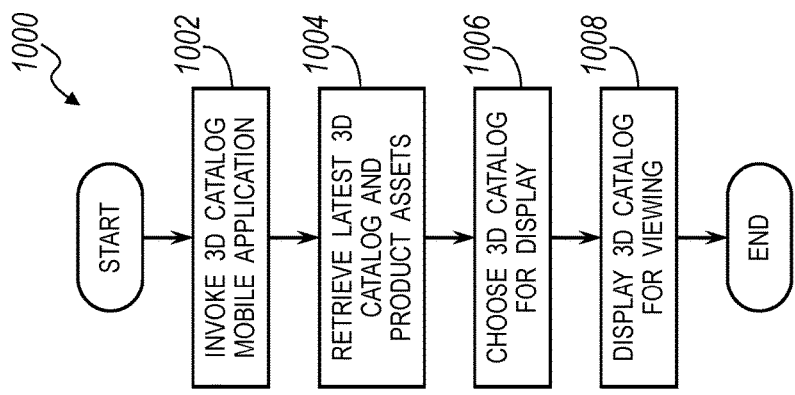
FIG. 10 illustrates an example process for invoking the 3D catalog mobile application to view a 3D catalog.

FIG. 10 illustrates an example process 1000 for invoking the 3D catalog mobile application 134 to view a 3D catalog 108. The process 1000 may be performed, for example, by the sales user device 128 onto which the 3D catalog mobile application 134 is installed.

At operation 1002, the sales user device 128 receives an indication from the user to invoke the 3D catalog mobile application 134. In an example, a user may select an icon of the 3D catalog mobile application 134 from a home screen of the sales user device 128. In another example, the sales user device 128 may be directed to download and install the 3D catalog mobile application 134 (e.g. from an app store or other download site), and then to execute the 3D catalog mobile application 134.

At operation 1004, the sales user device 128 retrieves the latest 3D catalog 108 and product assets. The product assets may include, for example, 3D product models 102, product media 104, and branding 110 related to the 3D catalogs 108. In an example, the 3D catalog mobile application 134 may utilize user account 112 information to query the front-end server 122 regarding whether there are updates to the 3D catalogs 108 for which the user account 112 has permission, new 3D catalogs 108 to download, or old 3D catalogs 108 that are no longer available. If so, the sales user device 128 may utilize the web services 124 of the front-end server 122 to synchronize the storage of the sales user device 128 with the catalog assets of the data store 118.

At operation 1006, the sales user device 128 chooses a 3D catalog 108 to be presented by the sales user device 128. In an example, the 3D catalog mobile application 134 may automatically select the one of the 3D catalogs 108 marked as being the default catalog for the user account 112. The default catalog 108 may have previously been specified, for example, by a catalog administrator using the catalog default control 306-D of the user interface 300. In another example, the 3D catalog mobile application 134 may automatically display the most recently viewed catalog 108 for the user, or may prompt the user to select a 3D catalog 108 for viewing.

At operation 1008, the sales user device 128 displays the 3D catalog 108 for viewing. As some examples, the 3D catalog mobile application 134 may display one or more of the user interfaces 500, 600 and 700 discussed in detail above. After operation 1008, the process 1000 ends.

Computing devices described herein, such as the database server 116, front-end server 122, sales user device 128, catalog administrator device 136, and third-party integrator server 138, generally include computer-executable instructions, where the instructions may be executable by one or more computing devices such as those listed above. Computer-executable instructions (such as those of the data store 118, web services 124, 3D catalog web portal 126, asset management portal 132, and 3D catalog mobile application 134) may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a server having a processor for executing computer-executable instructions and a memory for maintaining the computer-executable instructions, the computer-executable instructions when executed by the processor perform the following functions:
        render an interactive 3D rotatable and zoomable view of a 3D product model encoded in a 3D modeling format,
        display a first user interface including the interactive 3D rotatable and zoomable view of the 3D product model and a hotspot control, the first user interface is configured to receive a definition of product hotspots on the 3D product model through the hotspot control,
        receive, from a catalog administrator device, the definition of product hotspots through the hotspot control of the first user interface and including an association for each product hotspot of a location on the 3D product model with an element of product media related to an aspect of the 3D product model, such that the location of each product hotspot is configured to rotate and zoom with the 3D product model when rendered and displayed,
        store the 3D product model in a data store in association with the product hotspots and the elements of product media,
        display a second user interface including a selectable product control, the second user interface is configured to add the 3D product model stored in the data store to a 3D catalog through the selectable product control,
        receive, from the catalog administrator device, a selection of the selectable product control,
        deliver the 3D product model to a user device associated with a user account, wherein the 3D product model is configured to be displayed on the user device,
        receive a product hotspot selection of one or more of the product hotspots (i) from the definition of product hotspots received through the hotspot control of the first user interface and (ii) by the user device associated with the user account, and
        store, in the data store, the product hotspot selection and the associated user account that made the product hotspot selection.

2. The system of claim 1, wherein the computer-executed instructions when executed by the processor perform the following further function: brand the 3D catalog with a non-product media asset identifying a brand or category of content of the 3D catalog.

3. The system of claim 1, wherein the computer-executed instructions when executed by the processor perform the following further functions:
    maintain analytics data indicative of at least one of (i) user session information indicative of access by the user device to the server device, and (ii) user interaction information received from the user device that is indicative of user interaction with the 3D product model, and
    provide an analytics web portal configured to provide information regarding the analytics data.

4. The system of claim 1, wherein the computer-executed instructions when executed by the processor perform the following further function: receive the elements of product media associated with the 3D product model from the catalog administrator device.

5. The system of claim 1, wherein the catalog administrator device is a third-party integrator server configured to provide periodic updates of a 3D catalog to the server device.

6. The system of claim 1, wherein the computer-executed instructions when executed by the processor perform the following further function: deliver the 3D product model and the elements of product media to the user device for offline use.

7. The system of claim 1, wherein the computer-executed instructions when executed by the processor perform the following further functions:
    present a third user interface for editing the 3D product model;
    receive a first selection to the third user interface of media files to be stored in the data store; and
    receive a second selection to the third user interface to edit attributes of the 3D product model being presented to associate one or more of the media files with the 3D product model.

8. The system of claim 1, wherein the computer-executed instructions when executed by the processor perform the following further functions:
    present a third user interface for editing the 3D product model;
    receive a first selection to the third user interface to identify a 2D location from a current view of the 3D product model;
    determine a 3D location on the 3D product model for the hotspot responsive to the first selection; and
    receive a second selection to the third user interface to specify one or more elements of product media to be associated with each of the product hotspots.

9. The system of claim 1, wherein the computer-executed instructions when executed by the processor perform the following further function: deliver the 3D product model in the 3D modeling format along with texture image files to be mapped onto a surface of the 3D product model.

10. The system of claim 1, wherein the computer executed instructions when executed by the processor perform the following further function: deliver the 3D product model in the 3D modeling format along with shader instructions descriptive of how the 3D product model is to be displayed.

11. A system comprising:
    a server having a processor for executing computer-executable instructions and a memory for maintaining the computer-executable instructions, the computer-executable instructions when executed by the processor perform the following functions:
  render an interactive 3D rotatable and zoomable view of a 3D product model encoded in a 3D modeling format,
  display a first user interface including the interactive 3D rotatable and zoomable view of the 3D product model and a hotspot control, the first user interface is configured to receive a definition of product hotspots on the 3D model through the hotspot control,
  receive, from a catalog administrator device, a definition of product hotspots through the hotspot control of the first user interface and including an association for each product hotspot of a location on the 3D product model with an element of product media related to an aspect of the 3D product model,
  store the 3D product model in a data store in association with the product hotspots and the elements of product media,
  display a second user interface including a selectable product control, the second user interface is configured to add the 3D product model stored in the data store to a 3D catalog through the selectable product control,
  receive, from the catalog administrator device, a selection of the selectable product control
  deliver the 3D product model to a user device associated with a user account, wherein the 3D product model is configured to be displayed on the user device,
  receive a product hotspot selection of one or more of the product hotspots (i) from the definition of product hotspots received through the hotspot control of the first user interface and (ii) by the user device associated with the user account, and
  store, in the data store, the product hotspot selection and the associated user account that made the product hotspot selection.

12. The system of claim 11, further comprising an analytics web portal configured to allow a user to view information regarding the product hotspot selection and the associated user account that made the product hotspot selection.

13. The system of claim 11, wherein the computer-executed instructions when executed by the processor perform the following further function: receive session information indicative of access by the user device to the server device.

14. The system of claim 11, wherein the computer-executed instructions when executed by the processor perform the following further function: send the definition of product hotspots to the user device.

15. The system of claim 11, wherein the computer-executed instructions when executed by the processor perform the following further function: brand the 3D catalog with a non-product media asset identifying a brand or category of content of the 3D catalog.

16. A system comprising:
  a server having a processor for executing computer-executable instructions and a memory for maintaining the computer-executable instructions, the computer-executable instructions when executed by the processor perform the following functions:
    render an interactive 3D rotatable and zoomable view of a 3D product model encoded in a 3D modeling format,
    display a first user interface including the interactive 3D rotatable and zoomable view of the 3D product model and a hotspot control, the first user interface is configured to receive a definition of product hotspots on the 3D product model through the hotspot control,
    receive, from a catalog administrator device, a definition of product hotspots through the hotspot control of the first user interface and including an association for each product hotspot of a location on the 3D product model with an element of product media related to an aspect of the 3D product model,
    store the 3D product model in a data store in association with the product hotspots and the elements of product media,
    display a second user interface including a selectable product control, the second user interface is configured to add the 3D product model stored in the data store to a 3D catalog through the selectable product control,
    receive, from the catalog administrator device, a selection of the selectable product control
    deliver the 3D product model to a user associated with a user account, wherein the 3D product model is configured to be displayed on the user device,
    receive a product hotspot selection of one or more of the product hotspots (i) from the definition of product hotspots through the hotspot control of the first user interface and (ii) by the user device associated with the user account and a selection time, and
    store, in the data store, the product hotspot selection, the associated user account that made the product hotspot selection, and the selection time.

17. The system of claim 16, further comprising an analytics web portal configured to allow a user to view information regarding the product hotspot selection, the associated user account that made the product hotspot selection, and the selection time.

18. The system of claim 16, wherein the computer-executed instructions when executed by the processor perform the following further function: receive session information indicative of access by the user device to the server device.

19. The system of claim 16, wherein the computer-executed instructions when executed by the processor perform the following further function: send the definition of product hotspots to the user device.

20. The system of claim 16, wherein the computer-executed instructions when executed by the processor perform the following further function: brand the 3D catalog with a non-product media asset identifying a brand or category of content of the 3D catalog.

* * * * *